United States Patent Office 3,275,579
Patented Sept. 27, 1966

3,275,579
POLYSULFIDE POLYMER SEALING
COMPOSITION
Robert F. Stierli, Lexington, and John Becker, Winchester, Mass., assignors to W. R. Grace & Co., Cambridge, Mass., a corporation of Connecticut
No Drawing. Filed Jan. 22, 1964, Ser. No. 339,355
6 Claims. (Cl. 260—6)

This invention relates to sealants. In a particular aspect it relates to a polysulfide polymer sealant which is moisture curable.

Liquid polysulfide polymers which are convertible by curing to rubbery materials have been sold extensively under the registered trademark "Thiokol." The cured rubbery polymers are inert to oil and most solvents. They are tough and resilient and retain their flexibility at extremely low temperatures. Moreover, they are impermeable to gases and moisture and are capable of adhesion to such diverse materials as glass, metals, plastics, wood, leather and fabric. Because of these valuable properties, they have been used widely as caulking, sealing, coating and impregnating materials.

The curable liquid polysulfide polymers are sold mainly as a two-component system, i.e. the polymer itself and the curing agent therefor. Each component is individually packaged. When the two components are mixed, the resulting mixture ordinarily has a working life of less than 24 hours.

An inherent disadvantage of the two-component system is that each component must be packaged separately. Another disadvantage is the need for mixing the two components on the job site.

It is a principal object of the present invention to provide a curable liquid polysulfide polymer composition in a single package.

According to the present invention, the curing agent for the polymer is first inactivated and then incorporated into the liquid polymer. The curing agent is comprised of zinc oxide and an amine accelerator therefor. The zinc oxide particles are rendered inactive by coating the particles with an adhesive which is water-soluble. The amine is retained in an inactive state by the use of a molecular sieve, i.e. the amine is loaded on a molecular sieve. When the adhesive-coated zinc oxide and the amine-loaded molecular sieve are incorporated into the liquid polysulfide polymer, the resulting composition is substantially stable in the absence of moisture. Upon exposure to a damp medium, such as atmospheric air, moisture slowly dissolves the adhesive coating on the zinc oxide particles, and concurrently therewith, the moisture displaces the amine in the molecular sieve. The released zinc oxide and amine thereafter combine to cure the liquid polymer to a rubbery solid.

Briefly stated, the composition of the present invention is comprised of a curable liquid polysulfide polymer, adhesive-coated zinc oxide particles, and an amine-loaded molecular sieve.

The polysulfide liquid polymer used in the instant composition is a dimercaptan manufactured in liquid form and capable of being polymerized by suitable curatives to a tough rubber. It is a poly-functional mercaptan containing recurring disulfide linkages (—S—S—). It is sometimes represented by the formula

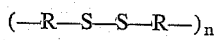

with the understanding that commercial polysulfide liquid polymers usually contain thiol groups (—SH) but can be replaced in part, if so desired, by terminal alkyl, aryl, hydroxyl, allyl and carboxyl groups.

Polysulfide liquid polymers suitable for use in the present invention are described in an article by Jorczak et al. published in Industrial and Engineering Chemistry, vol. 43, page 324, February 1951. This article refers to U.S. Patent No. 2,466,963 to Patrick et al. which also describes polysulfide liquid polymers that can be used in the preparation of the compositions of the present invention.

Generally, the polysulfide liquid polymers which can be used in preparing the composition of the present invention are those having the formula:

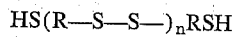

where $n$ is an integer from 3 to 100 or more and R is a radical of the type disclosed in the said publication by Jorczak et al. Usually the radical R can be presented by the formula

Preferably, a polysulfide liquid polymer is selected having the above formula where $n$ is from 10 to 70. The optimum range for $n$ is from 20 to 45.

Polysulfide liquid polymers having the above mentioned formula are available with varying amounts of trifunctionality and all appear to be suitable in the preparation of the instant composition.

The zinc oxide used may be either the pure compound or any of various commercial products which contain small amounts of impurities. In order to achieve a uniform dispersion, it is necessary that the size of the zinc oxide particles be sufficiently small. Commercially available zinc oxide may be satisfactory but it is generally desirable to ball mill the material for 24 hours before using. Excess ball milling is harmless. The amount of zinc oxide used in the instant composition is dependent on the cure rate desired. Generally, amounts in the range of about 30 to about 85 percent by weight of the liquid polysulfide polymer are satisfactory.

The adhesive used to coat the zinc oxide particles must be water-soluble. Suitable adhesives include animal glue; synthetic resins such as polyvinyl alcohol and sodium polyacrylate; and vegetable adhesives such as starch, dextrin and natural gums like gum tragacanth and gum arabic.

The amount of adhesive used to coat the zinc oxide particles may vary from about 0.5 to about 2.0 percent by weight of the zinc oxide. Adhesive used in amounts lower than 0.5 percent may not coat the zinc oxide particles sufficiently. Amounts of adhesive greater than 2.0 percent generally produce coatings which are too thick and cause undesirably low cure rates.

To coat the zinc oxide particles, the adhesive is first dissolved in water. A wetting agent should be added to the adhesive solution to provide a more uniform, continuous coating of the adhesive on the zinc oxide particles. Representative of such wetting agents are soaps, detergents and surface-active agents as, for example, alkyl benzene sodium sulfonate, polymerized sodium salts of alkyl naphthalene sulfonic acid, sodium polyacrylate and the dioctyl ester of sodium sulfosuccinic acid. The zinc oxide particles are then coated with the adhesive solution. This may be accomplished by any conventional method such as spraying or simply adding the zinc oxide to the adhesive solution with mixing preferably at high speed. Rapid mixing may be attained by use of conventional equipment such as an Eppenback mixer or lightning mixer. The wet coated zinc oxide particles are then dried at an elevated temperature, i.e. about 200° F. to 350° F.

The amine used in the instant composition is of the type which activates the zinc oxide to accelerate the cure of the liquid polysulfide polymer. Repre these amines are triethanol amine, triethylene tetramine, diethylene triamine, dibutyl amine and piperidine.

The amine is inactivated by use of a molecular sieve. Molecular sieves are synthetic crystalline metal aluminosilicates belonging to a class of minerals known as zeolites. These materials undergo dehydration with little or no change in their crystal structure. The dehydrated crystals are honey-combed with regularly spaced cavities interlaced by channels of molecular dimensions. This network of uniform pores and cavities comprises almost 50% of the total volume of the crystals. The empty cavities in these dehydrated or activated molecular sieves have a strong tendency to recapture the water molecules that have been driven off. If no water is present, they will accept any molecules that are small enough to pass through the pores into the adsorption cavity. To inactivate the amine, any conventional method may be used to adsorb the amine on the dehydrated molecular sieve.

The amine-loaded molecular sieve is a fine powder having a particle size of about 1 to 5 microns. The molecular sieve, itself, is an inert material and has no effect on the properties of the instant composition.

The amount of amine used is dependent upon the amount of zinc oxide used. Ordinarily, amounts of amine from about 2 percent to about 10 percent by weight of the zinc oxide are satisfactory.

In addition to the curing agent, various ancillary materials such as fillers, pigments and reinforcing agents, e.g. barium sulfate, calcium carbonate, silicon dioxide, titanium oxide, bentonite and magnesium silicate may be incorporated in the composition.

The components may be combined in any type of equipment that permits mixing of sufficient rigor to wet all particles, break up large agglomerates and to secure and maintain a homogeneous mixture.

The composition may be applied by caulking gun, trowel or knife to any surface, crack or joint. It bonds to concrete, iron, aluminum, bronze, rubber, steel, stainless steel, marble, glass, wood and is very effective for curtain wall construction. It may be easily coated with paint after 7 days.

Parts and percentages used here and elsewhere herein are by weight.

EXAMPLE I 10 parts of a dry animal glue ("PC Standard Diamond #1 Clear Special Glue") were dissolved in 500 parts by water. 5 parts of a wetting agent comprised of a 25 percent aqueous solution of the sodium salt of polyacrylic acid ("Daxad 30") were stirred into the adhesive solution for about 2 to 3 minutes. 500 parts of zinc oxide ("Kadox 25") were then added to the solution. The mixture was stirred in an Eppenback mixer at high speed for 10 to 15 minutes to thoroughly wet the particles. The resulting mixture was placed in an oven maintained at 230° F. and dried for about 24 hours. The dried zinc oxide particles appeared to be encapsulated by the glue coating.

A liquid polysulfide polymer ("Thiokol LP-32") having the following properties was used.

Formula:

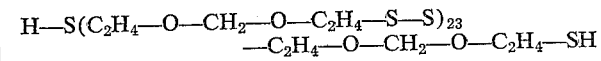

| | |
|---|---|
| Physical state | Liquid—viscosity 350–450 poises at 80° F. |
| Color | Amber. |
| Specific gravity | 1.27. |
| Molecular weight | 4,000 approx. |
| Stability | Over 3 years. |
| Water content | Less than 0.2%. |
| pH (water extract) | 6.0 to 8.0. |
| Weight per gallon | 10.5 lbs. |
| Boiling point | Not distillable. |

1200 parts of the liquid polysulfide polymer were mixed with 438 parts of the glue coated zinc oxide on a paint mill.

The mixture was then added to a Werner Perkins mixer along with 240 parts of titanium dioxide and 300 parts of calcium carbonate and mixed until a uniform dispersion was obtained. The dispersion was dehydrated by continuing the mixing under a vacuum of 18 mm. at 75° C. for 3½ hours. The dispersion was then allowed to cool at atmospheric pressure to 81° F.

84 parts of a triethylene tetramine loaded molecular sieve ("CW 1318") having 15 percent by weight or 12.6 parts of the amine were then mixed into the dispersion. To adjust the viscosity of the dispersion, 50 parts of an aromatic solvent ("Solvesso 150," flash point 145–150° F.) prepared from petroleum were added to the dispersion and mixed to form a final composition having a fluid uniform putty-like consistency.

EXAMPLE II

A sample of the composition prepared in Example I was spread on a glass plate to form a layer about 50 millimeters thick. The layer was exposed to air maintained at approximately 50% relative humidity at room temperature.

A thick skin formed over the layer within about 24 hours. The skin was slightly tacky after two days.

EXAMPLE III

A sample of the composition prepared in Example I was stored under nitrogen in a sealed container at 120° F. After three days the sample was still fluid.

EXAMPLE IV

A sample of the composition prepared in Example I was stored under nitrogen in a sealed container at room temperature. After sixty days the sample was still fluid and showed no cure.

EXAMPLE V

A composition was prepared as described in Example I except that 5 parts of the dry animal glue were used to form an adhesive coating 1 percent by weight of the zinc oxide.

A sample of this composition was tested as set forth in Example II. A thick skin formed over the layer within about 24 hours and was only very slightly tacky after two days.

Samples of this composition were also tested as set forth in Examples III and IV. The samples retained their fluid character and showed no signs of cure.

We claim:

1. A composition which is devoid of water comprising a liquid polysulfide polymer containing recurring disulfide linkages (—S—S—) and is a polyfunctional mercaptan, zinc oxide particles coated with a water-soluble adhesive, said adhesive being present in an amount of about 0.5 to 2.0 percent by weight of the zinc oxide, and an amine-carrying molecular sieve containing 2 to 10 percent amine by weight of the zinc oxide wherein the amine is an accelerator for the zinc oxide.

2. A composition according to claim 1 wherein the adhesive is animal glue.

3. A composition according to claim 1 wherein the amine is triethylene tetramine.

4. A composition according to claim 1 wherein the zinc oxide is present in an amount ranging from 30 to 85 percent by weight of the polymer.

5. A composition which is devoid of water comprising a liquid polysulfide polymer having the formula

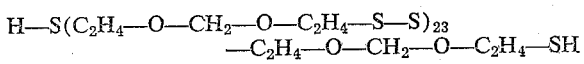

a molecular weight of approximately 4000, and a viscosity of 350–450 poises at 80° F.; zinc oxide particles coated with water-soluble glue, said glue being present in an amount of 1.0 to 2.0 percent by weight of the zinc oxide; and 84 parts by weight of a triethylene tetramine-carrying molecular sieve containing 15 percent by weight of amine.

6. A composition according to claim 1 wherein the polymer has the formula $$HS(R-S-S)_nRSH$$

where R represents the radical $$-C_2H_4OCH_2OC_2H_4-$$

and $n$ is an integer from 3 to 100.

References Cited by the Examiner

UNITED STATES PATENTS

| | | | |
|---|---|---|---|
| 1,950,956 | 3/1934 | Wilhelm | 117—100 |
| 2,429,698 | 10/1947 | Schneider | 260—79.1 |
| 3,018,258 | 1/1962 | Meier et al. | 260—2 |
| 3,215,677 | 11/1965 | LeFave et al. | 260—79 |

OTHER REFERENCES

Chemical Loaded Molecular Sieves in Rubber and Plastics, published by Linde Co., Division of Union Carbide Corp., F–1349 (1959).

WILLIAM H. SHORT, *Primary Examiner.*

E. M. WOODBERRY, *Assistant Examiner.*